E. S. SNYDER.
Millstone.
No. 4,382.
Patented Feb. 10, 1846.
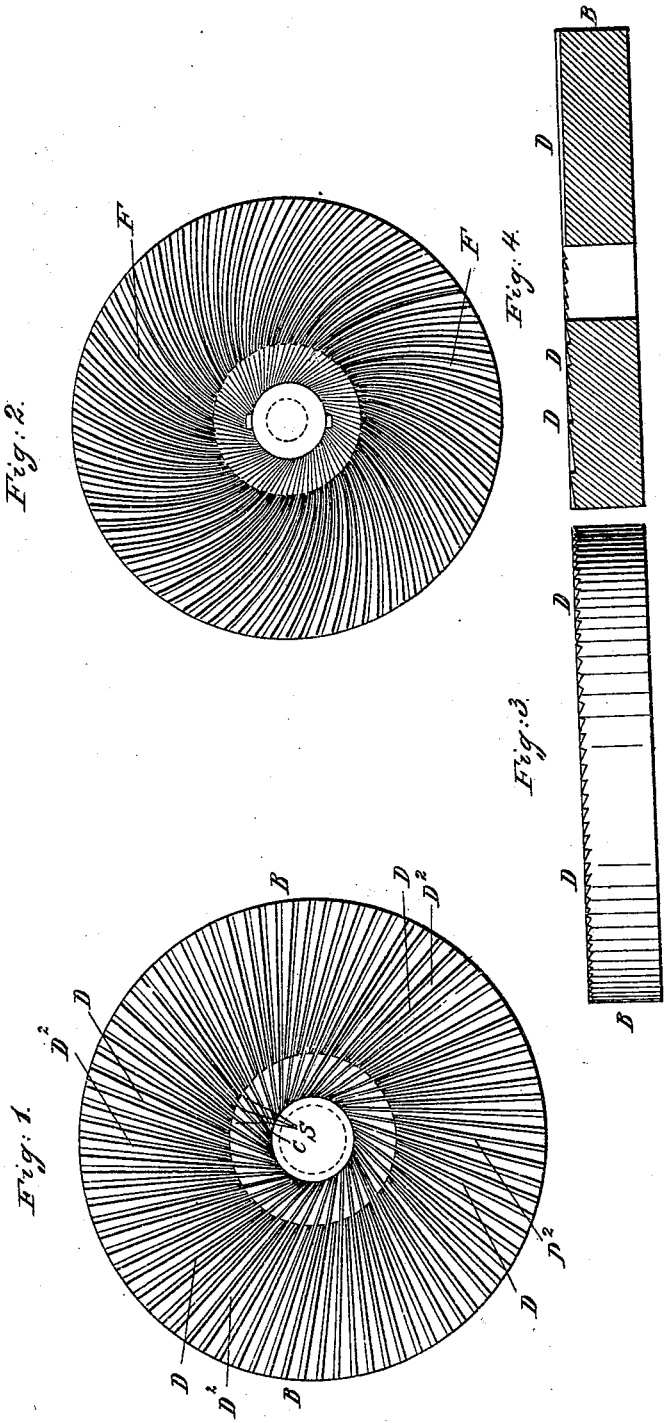

UNITED STATES PATENT OFFICE.

ELISHA S. SNYDER, OF CHARLESTOWN, VIRGINIA.

MILL FOR GRINDING.

Specification forming part of Letters Patent No. 4,382, dated February 10, 1846; Reissued June 20, 1854, No. 266.

*To all whom it may concern:*

Be it known that I, ELISHA S. SNYDER, of Charlestown, Jefferson county, Virginia, have invented a new and useful Improvement in the Mode of Dressing Millstones, which is described as follows, reference being had to the annexed drawings of the same, making part of this specification.

Figure 1 is a plan of the mill stone with straight tangential furrows and no land. Fig. 2 is a plan of the mill stone with curved furrows and no land. Fig. 3 is an edge view. Fig. 4 is a vertical section.

My improvement consists in dressing the mill stone in lines tangential to the circle of the eye and without having, what millwrights term, land on the grinding surfaces, the furrows widening and deepening as they approach the circumference, also forming spaces around the eye for admitting the grain freely to the furrows.

I first describe a circle A concentric with the circumference B of the runner and about half the diameter thereof. The circle C of the eye represented by a dotted line, is also concentric with the circles just described and is about one eighth the diameter of the stone. The circumference of this circle C I also divide into an equal number of spaces according to the diameter of the stone and the size of the furrows required. I then draw lines D through all the points of these spaces tangential to the circle of the eye. Where these lines cut the circumference of the circle I draw through the intersecting points, on the outside of the stone, vertical lines parallel with the axis of the runner and with each other. On these lines I cut away the stone to the depth of $\frac{1}{8}$th of an inch, forming a furrow, which, in its vertical cross section is a right angle triangle—the hypotenuse of which is the bottom of the furrow. These furrows gradually diminish in depth from the circumference to the eye as shown in Fig. 4. Between these furrows are formed, in a similar manner, half furrows $D^2$, extending from the periphery to the concentric circle A aforesaid, which also gradually diminish in depth from the circumference toward the eye. These furrows are likewise formed on tangential lines $D^2$ to the circle A. These half furrows produce spaces or cavities $s$ around the eye for the free introduction of the grain to the furrows.

I sometimes dress the stone with curved furrows F as represented in Fig. 2—the furrows, in their cross section, being of the same figure as the straight furrows above described, and becoming shallower as they approach the eye. The bed stone is dressed in a similar manner.

What I claim as my invention and desire to secure by Letters Patent is—

The before described mode of dressing mill stones—that is to say in ridges and furrows tangential to the eye each furrow gradually increasing in width and depth from the eye to the circumference, being of a triangular shape in its vertical cross section, and every alternate ridge being omitted from the eye to the circle A forming large triangular cavities S for the admission of the grain to be broken preparatory to its passing to the long furrows to be ground into flour.

ELISHA S. SNYDER.

Witnesses:
ABRAHAM SNYDER,
JEREMIAH N. SNYDER.